(12) United States Patent
Beg

(10) Patent No.: US 7,302,502 B2
(45) Date of Patent: Nov. 27, 2007

(54) METHODS AND SYSTEMS FOR MONITORING A HARDWARE COMPONENT IN A COMPUTER SYSTEM

(75) Inventor: Ajmal Mirza Muhammad Beg, Bexley North (AU)

(73) Assignee: SAP AG, Walldorf (DE)

( * ) Notice: Subject to any disclaimer, the term of this patent is extended or adjusted under 35 U.S.C. 154(b) by 504 days.

(21) Appl. No.: 10/868,011

(22) Filed: Jun. 16, 2004

(65) Prior Publication Data
US 2005/0033871 A1   Feb. 10, 2005

(51) Int. Cl.
*G06F 3/00* (2006.01)
(52) U.S. Cl. ........................................ 710/15
(58) Field of Classification Search .................. 710/15
See application file for complete search history.

(56) References Cited

U.S. PATENT DOCUMENTS 6,831,555 B1 * 12/2004 Miller et al. ................ 340/506
6,832,236 B1 * 12/2004 Hamilton et al. ........... 718/100

\* cited by examiner

*Primary Examiner*—Donald Sparks
*Assistant Examiner*—Harold Kim
(74) *Attorney, Agent, or Firm*—Finnegan, Henderson, Farabow, Garrett & Dunner, LLP (57) ABSTRACT

A hardware component is monitored in a computing system. The utilization of the hardware component is sampled at a predefined sampling rate for a predefined sampling period. The proportion of the sampled values taken during the sampling period that fall within a predefined range of values is determined. A value representative of the proportion along with time information identifying the time of the sampling period is stored. Storing occurs when the value representative of the proportion exceeds a predefined threshold.

16 Claims, 7 Drawing Sheets

Case Study 1

(CPU Bottleneck Detection)

| Range of interest: | 95% to 100% |
|---|---|
| Threshold value: | 30% |
| Length of sampling period: | 1 hour |
| Sampling rate: | 720 per hour |
| Start and end time: | 1 Jan 2003 0:00 to 31 Jan 2003 23:59 |
| Data retention period: | 365 days |

Results:

| Day | Time | % of samples within range of interest |
|---|---|---|
| 3 Jan 2003 | 10:00-11:00 | 70% |
| 4 Jan 2003 | 10:00-11:00 | 72% |
|  | 11:00-12:00 | 35% |
| 5 Jan 2003 | 10:00-11:00 | 73% |

Fig. 4

Case Study 2
(CPU Sizing)

| Range of interest: | 49% to 100% |
|---|---|
| Threshold value: | 20% |
| Length of sampling period: | 1 hour |
| Sampling rate: | 720 per hour |
| Start and end time: | 1 May 2003 0:00 to 30 September 2003 23:59 |
| Data retention period: | 365 days |

Results:

| Day | Time | % of samples within range of interest |
|---|---|---|
| 30 May 2003 | 09:00-10:00 | 35% |
| 30 June 2003 | 09:00-10:00 | 40% |
|  | 10:00-11:00 | 41% |
| 31 July 2003 | 09:00-10:00 | 37% |
| 29 August 2003 | 09:00-10:00 | 38% |
| 30 September 2003 | 09:00-10:00 | 35% |

Fig. 5

Case Study 3

(Running Heavy Batch Job During Daytime)

| Range of interest: | 0% to 30% |
|---|---|
| Threshold value: | 80% |
| Length of sampling period: | 1 hour |
| Sampling rate: | 720 per hour |
| Start and end time: | 2 May 2003 09:00 to 17:30 |
| Data retention period: | 30 days |

Results:

| Day | Time | % of samples in range of interest |
|---|---|---|
| 2 May 2003 | 09:00-10:00 | 90 |
| | 12:00-13:00 | 83 |
| | 14:00-15:00 | 85 |

Fig. 6

Case Study 4

(New Year Sales Plan with New Marketing Strategy)

| | |
|---|---|
| Range of interest: | 0% to 33% |
| Threshold value: | 1% |
| Length of sampling period: | 1 hour |
| Sampling rate: | 720 per hour |
| Start and end time: | 1 Jan 2003 09:00 to |
| | 10 Jan 2003 17:00 |
| | 1 Jan 2004 09:00 to |
| | 10 Jan 2004 17:00 |
| | 1 Jan 2005 09:00 to |
| | 10 Jan 2005 17:00 |
| Data retention period: | 1095 days |

Results:

| Day | Time | % of samples in range of interest |
|---|---|---|
| 2 Jan 2003 | 09:00-10:00 | 50% |
| | 10:00-11:00 | 55% |
| | 11:00-12:00 | 50% |
| | 12:00-13:00 | 85% |
| | 13:00-14:00 | 86% |
| | 14:00-15:00 | 90% |

Fig. 7

METHODS AND SYSTEMS FOR MONITORING A HARDWARE COMPONENT IN A COMPUTER SYSTEM

This application is based upon and claims the benefit of priority from prior Australian patent application 2003903096, filed Jun. 18, 2003, and prior patent application EP 04100772.5, filed Feb. 26, 2004, the entire contents of each which are expressly incorporated herein by reference.

BACKGROUND

I. Technical Field

The present invention relates to methods and systems for monitoring the use of a hardware component in a computing system.

II. Background Information

In a computing system, utilization of a piece of hardware refers to a measurement of the working rate or usage of the hardware. It is typically expressed as a percentage of the maximum working rate or maximum usage of the piece of hardware. For example, if a processor is said to be at sixty percent utilization, then it is working at sixty percent of its maximum working rate. At this rate, forty percent of the clock cycles of the processor are idle clock cycles and serve no useful purpose in the operation of the computing system. In other words, the processor could handle forty percent more processing. Similarly, if a computer memory is at five percent utilization, then ninety-five percent of its memory is unused and is available to store additional information.

In a computer system, utilization of hardware components such as a processor, a memory, or a communications link may be monitored to provide information about the operation of the computer system. This information is useful to administrators and users of computer systems. For example, utilization information may be used to determine whether there is a bottleneck in the computing system due to a piece of hardware. If the bottleneck is identified, then action can be taken to improve the overall operation of the system. Other reasons for obtaining utilization information include determining whether an existing computing system can cope with forecast increased load, load balancing a networked computing system to efficiently use existing hardware, and planning hardware upgrades.

An operating system loaded on the computing system typically provides functionality that allows for a determination of the utilization of various hardware components. One may collect utilization information for a piece of hardware by regularly sampling and storing a value representing its utilization. For example, its level of use may be sampled every six seconds. However, this method results in a large amount of stored data. For example, for just one piece of hardware, six hundred samples are taken and stored every hour. Over the period of one year this amounts to over five million sampled values. Accordingly, such a method is not suitable for monitoring numerous components simultaneously, or for use over an extended period of time because the volume of stored data becomes excessively large.

One approach for reducing the amount of stored information is to calculate an average of the samples taken over a given period of time, such as one hour, and store only the average value. However, this method has a major drawback. When monitoring a processor, if over a given hour fifty percent of the samples taken have a value of a hundred percent and the remaining samples have a value of thirty percent, then the average sampled value for that hour will be sixty-five percent. Thus, it would not be apparent to a person examining the average sample data that the processor was operating at one hundred percent capacity for half of an hour and was likely to have been delaying users or causing an overall delay in a larger computing system. In a busy business environment, a performance degradation of thirty minutes can have a serious impact on the business. Accordingly, such an approach does not provide a satisfactory solution.

SUMMARY

Consistent with the present invention, a method monitors the use of a hardware component in a computing system. The method comprises sampling the use of the hardware component at a predefined sampling rate for a predefined sampling period. The proportion of the sampled values taken during the sampling period that fall within a predefined range of values is determined. A value representing the proportion along with time information identifying the time of the sampling period is stored.

According to the method, a reduced data set is prepared from the sampled data without introducing the same inaccuracies that occurred in previous averaging techniques. This is done by determining the proportion of samples falling in a predefined range of interest. An analysis of the stored data indicates the proportion of samples that are within the range of interest. As a result, the stored data more accurately reflects actual use of the component, thus allowing informed planning decisions to be made in connection with the computer system.

The storing step may be carried out if the value representing the proportion exceeds a predefined threshold. The threshold is set at a level that is significant to the monitoring being carried out. An event that does not meet the threshold is not considered significant and the data is not stored. This further reduces the amount of stored data.

The stored data may be deleted after a predefined length of time has elapsed. The predefined length of time indicates how long the stored data is retained. Data that is not needed in the long term can be deleted. Conversely, long-term data may be retained for long periods and then be deleted automatically. Furthermore, sampling may be scheduled to occur between a start time and an end time. The method may be repeated for subsequent sampling periods to observe how performance varies over time.

Consistent with the principles of the present invention, a system monitors the use of a hardware component in a computing system. The system comprises sampling means for sampling the use of the hardware component at a predefined sampling rate for a predefined sampling period; determination means for determining the proportion of the sampled values taken during the sampling period that fall within a predefined range of values; and storage means for storing a value representative of the proportion along with time information identifying the time of the sampling period.

The system may further comprise defining means to allow the sampling rate, the sampling period, or the range of values to be defined by a user. The system may further comprise scheduling means to schedule the sampling to occur between a start time and an end time. The system may further comprise deletion means for deleting the stored information after a predefined length of time has elapsed.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 1:
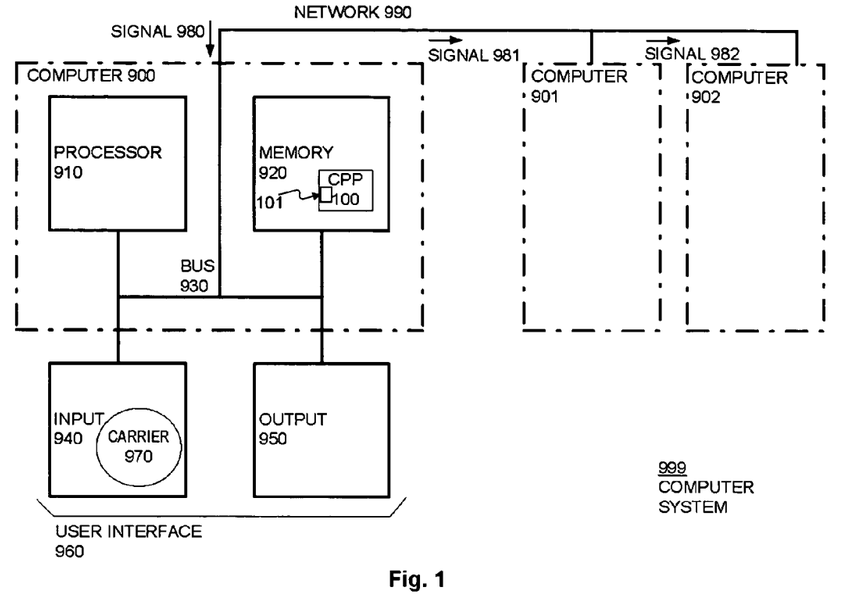
FIG. 1 is a schematic view of an exemplary computer system that may be monitored by a method or system consistent with the present invention.

FIG. 1 is a schematic view of an exemplary computer system 999 that may be monitored by a method or system consistent with the present invention. In FIG. 1, computer system 999 can include a plurality of computers 900, 901, 902 (or even more), as shown. Computer 900 can communicate with computers 901 and 902 over network 990. Computer 900 includes processor 910, memory 920, bus 930, and, optionally, input device 940 and output device 950 (I/O devices, user interface 960). As shown, system 999 includes a computer program product 100 (CPP, or "computer program") in memory 920, a carrier 970, or a signal 980.

In respect to computer 900, computer 901/902 is sometimes referred to as a "remote computer," computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is a central processing unit (CPU). Other computing devices may include other types of processors in the form of a micro-controller unit (MCU), digital signal processor (DSP), or the like.

Memory 920 has elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read-only memory (ROM), a random access memory (RAM), or a memory with other access options. Memory 920 is physically implemented by computer-readable media, for example, magnetic media, like a hard disk, a floppy disk, or other magnetic disk, a tape, a cassette tape; optical media, like optical disk (CD-ROM, digital versatile disk—DVD); or semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text processing tool. Modules are commercially available and can be installed on computer 900. For simplicity, these modules are not illustrated.

CPP 100 has program instructions and, optionally, data that cause processor 910 to execute method steps of the present invention. In other words, CPP 100 can control the operation of computer 900 and its interaction over network 999 so that it operates to perform in accordance with the invention. For example, CPP 100 can be available as source code in any programming language, and as object code ("binary code") in a compiled form. Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer-readable medium. Carrier 970 may be an article of manufacture having a computer-readable medium with computer-readable program code to cause the computer to perform methods of the present invention. Further, signal 980 can also embody computer program product 100. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), or a counter (e.g., a goods counter in a factory). Input device 940 can be used to read carrier 970.

Output device 950 presents instructions and data that have been processed. For example, this can be a monitor or a display, (cathode ray tube (CRT), flat panel display, liquid crystal display (LCD)), speaker, printer, plotter, or vibration alert device. Output device 950 can communicate with the user, but it can also communicate with other computers. Input device 940 and output device 950 can be combined to a single device.

Bus 930 and network 990 provide logical and physical connections by conveying instruction and data signals. While connections inside computer 900 are conveniently referred to as bus 930, connections between computers 900-902 are facilitated by network 990. Optionally, network 990 includes gateways that are computers that specialize in data transmission and protocol conversion.

Input device 940 and output device 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web). Network 990 can be a wired or a wireless network. For example, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, such as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements shown in FIG. 1 are also well known in the art. For simplicity, interfaces are not illustrated. An interface can be, for example, a serial port interface, a parallel port interface, a game port, a universal serial bus (USB) interface, an internal or external modem, a video adapter, or a sound card.

Figure 2:
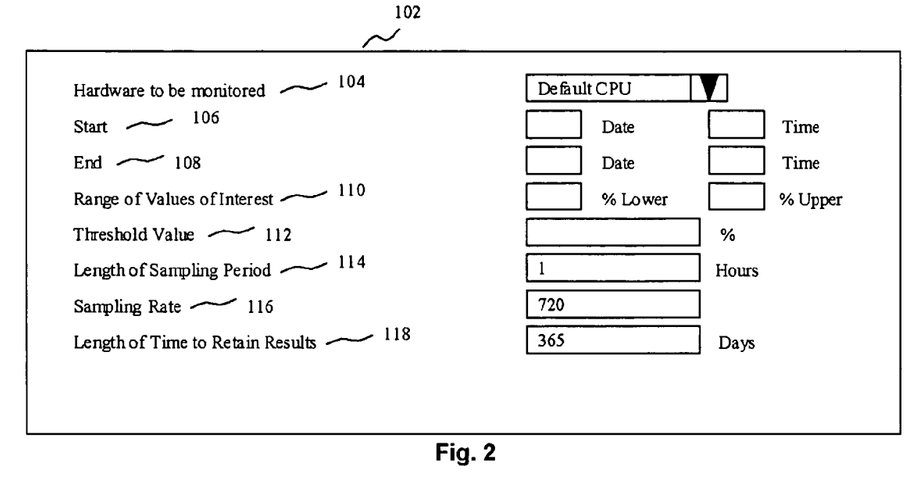
FIG. 2 is a user interface consistent with a system or method consistent with the present invention.

FIG. 2 is a user interface used in a system or method consistent with the present invention. CPP 100 may prompt a user who wishes to monitor a hardware component within computer system 999 to define certain parameters for the monitoring job that they plan to carry out. The user defines the necessary values by entering values at graphical user interface 102 using an input device such as a keyboard. Alternatively, the user could define values by responding to screen prompts or by using a configuration file that was created at an earlier time.

In one embodiment, CPP 100 requires the following parameters to be defined: the particular hardware component 104 that the user wishes to monitor; a start time 106 and an end time 108 for the monitoring job; a length of the sampling period; a range of values of interest 110 to the user; a threshold value 112 of the proportion of sample values falling within the range that must be met before data is saved; a length of a sampling period 114; a sampling rate 116; a length of time that any saved data must be retained 118.

Any of these values may initially be set to a default value that can be adjusted by the user. For example, the default value for the choice of a particular processor is the CPU of the computing device currently being used by the user. The default value for the sampling period is one hour and the default sampling rate is 720 samples per hour. The values defined by the user are then stored in memory 920.

Figure 3:
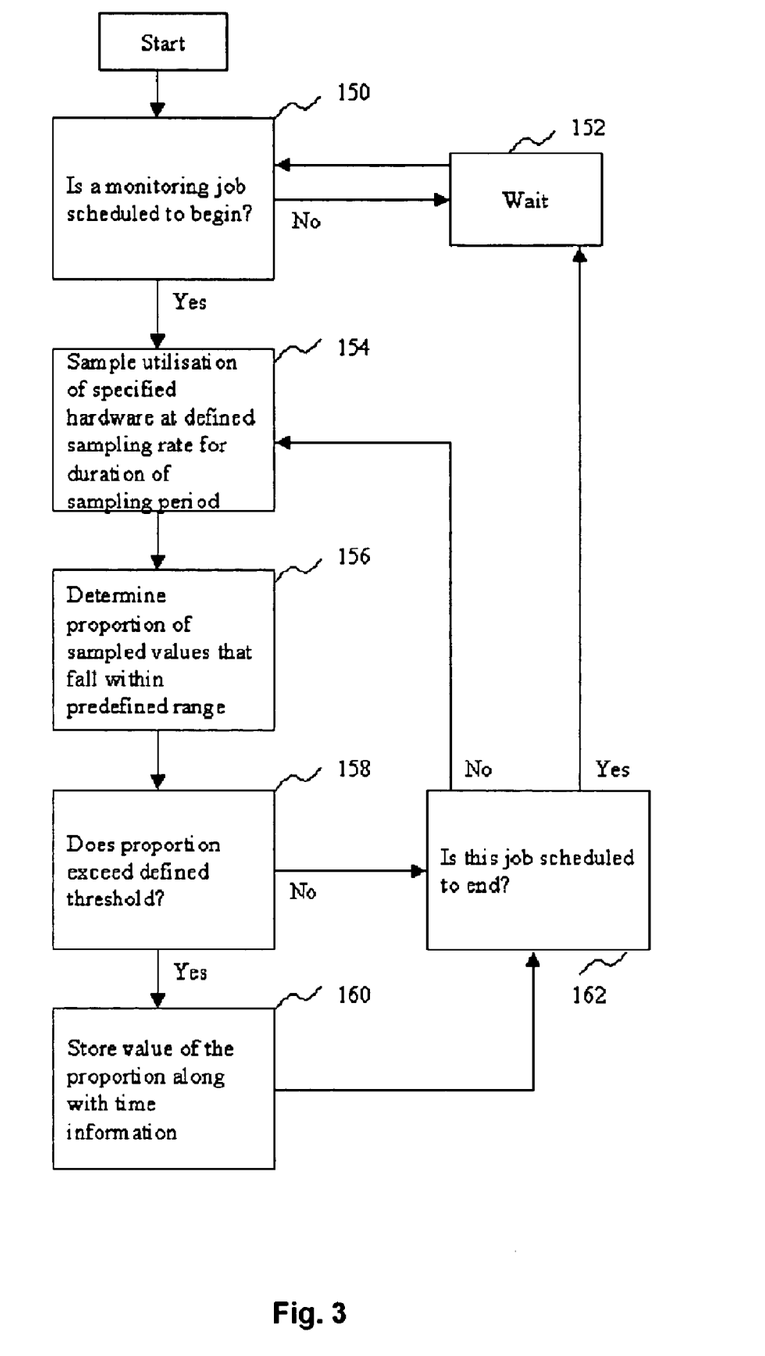
FIG. 3 is a logic flow diagram illustrating the steps of a method consistent with the present invention.

Referring to FIG. 3, CPP 100 determines whether a monitoring job is scheduled to begin at step 150. If a job is not scheduled, CPP 100 waits at step 152. If a job is scheduled to begin, at step 154, CPP 100 samples the use of the specified piece of hardware at the defined sampling rate for the defined sampling period according to the values defined for the particular monitoring job. The samples are temporarily held in memory 920. At the end of the sampling period, CPP 100 determines a proportion of the sampled values that are within the defined range of values of interest to the user at step 156.

At step 158, CPP 100 determines whether the proportion falling within the range exceeds the threshold level defined by the user. If it does, then CPP 100 stores the value of the proportion along with the time of day and the date on which the sampling took place at step 160. If the threshold is not exceeded, then the value of the proportion is not stored. In step 162, CPP 100 determines whether the job should continue for subsequent sampling periods according to the start and end times defined by the user.

CPP 100 includes a deletion means in the form of a software routine 101. CPP 100 executes the deletion software routine 101 at regular intervals to delete saved data that is no longer needed according to the length of time to retain the stored data defined by the user for various monitoring operations. For example, it may operate to delete data every Friday morning at 02:00, a time of probable low use of computer system 999.

Operation of the above-described embodiment is illustrated with reference to the following four case studies.

Case Study 1 (CPU Bottleneck Detection)

Figure 4:
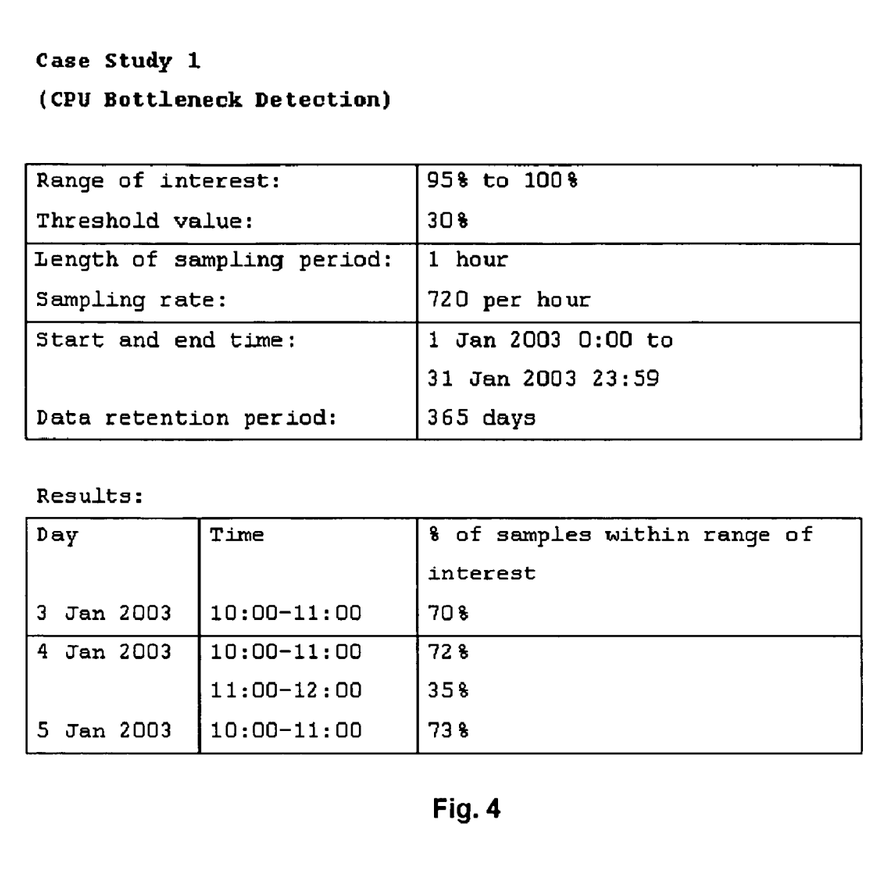
FIGS. 4-7 are tables with values and results for case studies 1-4.

A user is interested in detecting CPU bottlenecks over a year to determiner whether new hardware should be bought or load balancing should be carried out. The table in FIG. 4 lists values that are defined by the user and list results.

Case Study 2 (CPU Sizing)

Figure 5:
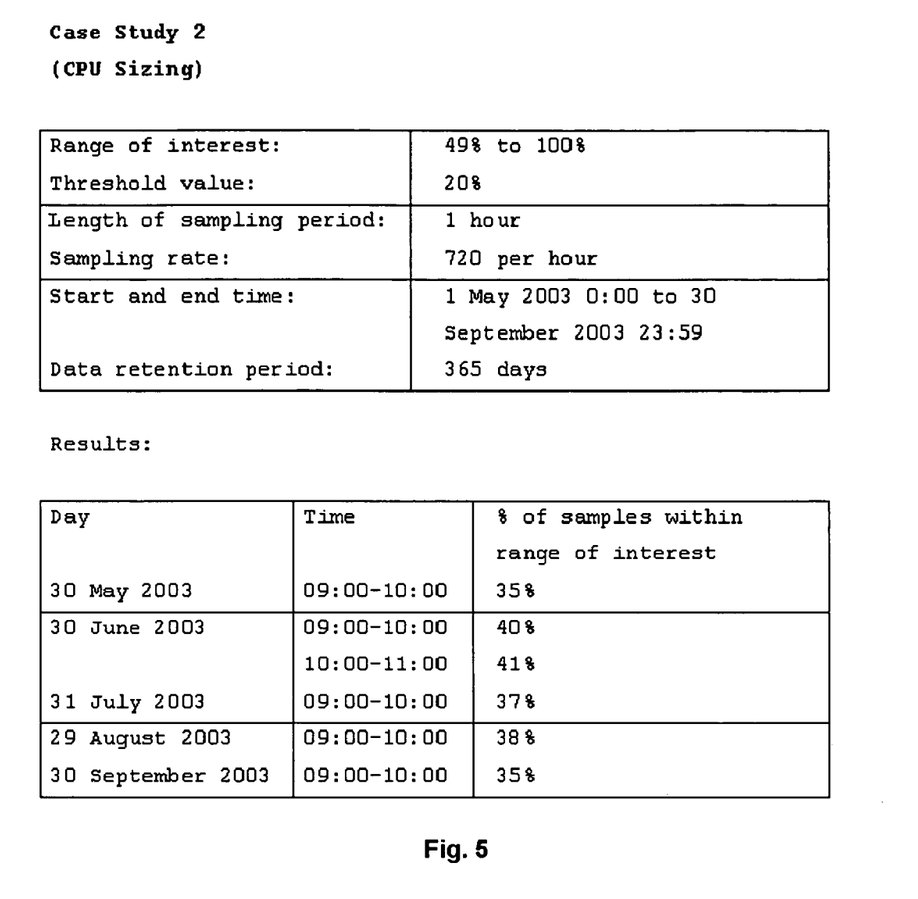

A user is planning to integrate three smaller companies and expects to double the number of users in the system after a year. The user would like to determine whether a current CPU capacity is enough to handle additional workload and, if it is not sufficient, how much more CPU power is needed. The required capacity is double the currently required capacity. The user defines values as shown in FIG. 5 to determine during which hours there will not be sufficient CPU power with double the current number of users.

The stored results data shows that during end of month processing users are expected to face hardware bottleneck related performance degradation. As a result, the company can distribute the end of month jobs to multiple days to avoid performance degradation.

Case Study 3 (Running Heavy Batch Job During Daytime)

Figure 6:
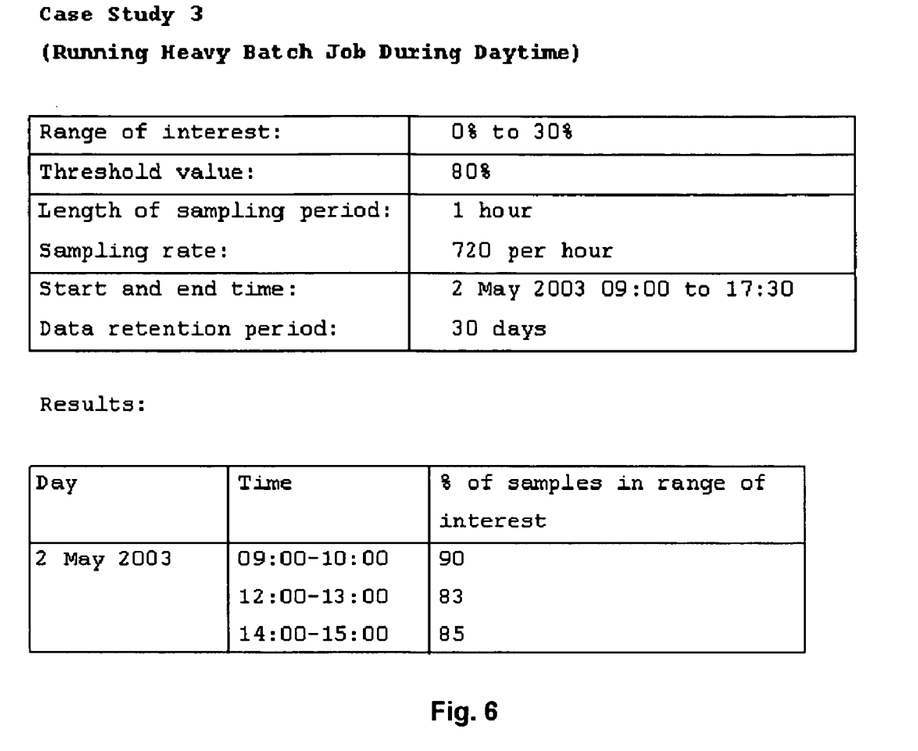

A user will not be able to finish background batch jobs during the night. The user wants to run one of the heavy batch jobs during the day. By referring to previous performance measurements, the user determines that when the job is run without any online user activity, CPU use is about sixty percent for eight percent of the samples taken. The job needs to be finished within one hour. The user defines the values as shown in FIG. 6 to determine a time when the CPU use with daytime online users only is below thirty percent for more than eighty percent of the samples taken. The results reveal that the computer system has capacity to run the heavy batch job during daytime between the hours shown in the table in FIG. 5.

Case Study 4 (New Year Sales Plan with New Marketing Strategy)

Figure 7:
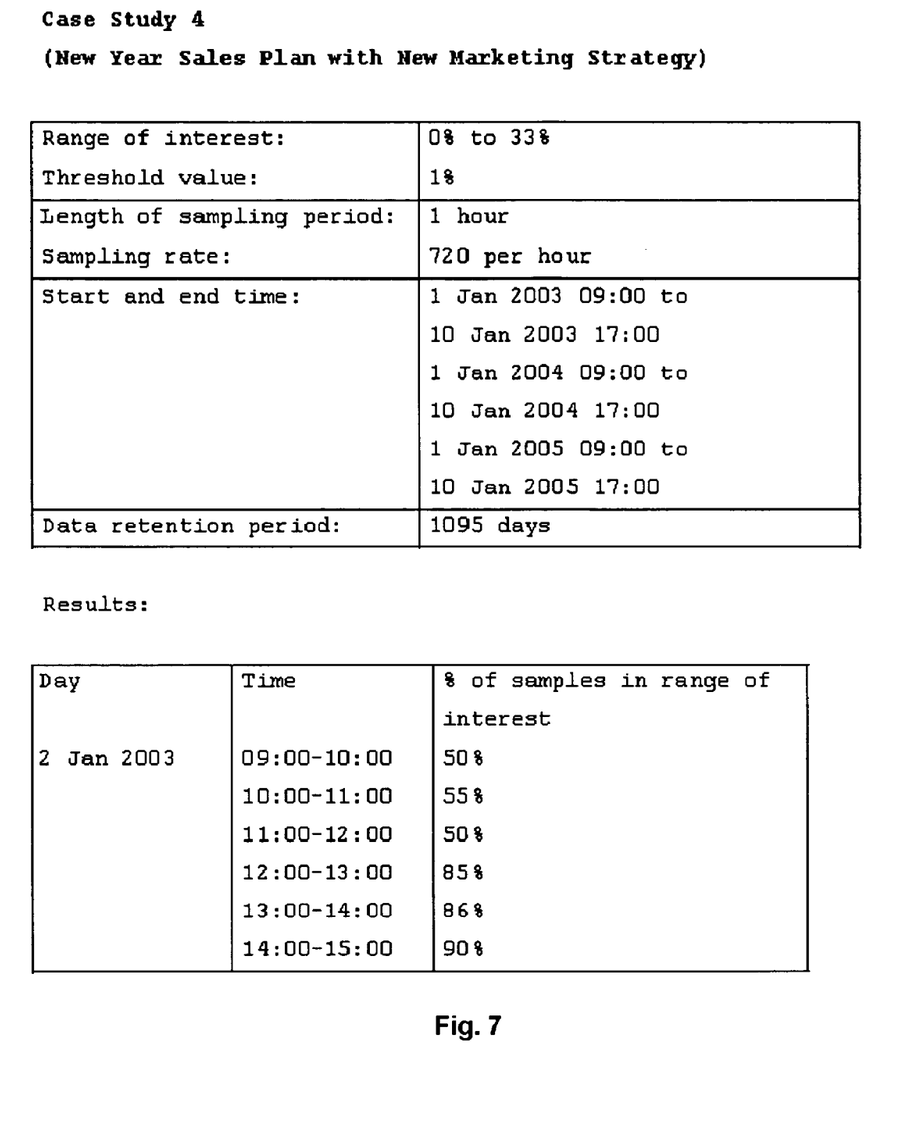

A user's company has developed a new marketing strategy and it is expected that the level of sales around the New Year period will triple each year for the next three years. The user defines the values shown in FIG. 7 to determine whether current CPUs are powerful enough to handle predicted future load around the New Year period. The results data shows that the system will not be able to handle triple the current workload during the first hours of an annual clearance sale that begins on January 2nd.

While the above-described case studies involve the monitoring of a processor, other hardware components such as memory, including hard drives, and communications links, including network connections, may similarly be monitored using systems or methods embodying the invention.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for monitoring a hardware component in a computing system, the method comprising:
    sampling a utilization of the hardware component, to obtain sampled values, at a predefined sampling rate for a predefined sampling period;
    determining the proportion of the sampled values taken during the sampling period that fall within a predefined range of values; and
    storing a value representative of the proportion and time information identifying the time of the sampling period.

2. The method according to claim 1, wherein the step of storing is carried out if the value representative of the proportion exceeds a predefined threshold.

3. The method according to claim 2, wherein a user defines the predefined threshold.

4. The method according to claim 1, further comprising the step of deleting the stored information after a predefined length of time has elapsed.

5. The method according to claim 4, wherein the predefined length of time is a user-defined length of time.

6. The method according to claim 1, wherein the sampling rate is a user-defined sampling rate.

7. The method according to claim 1, wherein the sampling period is a user-defined sampling period.

8. The method according to claim 1, wherein the predefined range of values is a user-defined predefined range of values.

9. The method according to claim 1, wherein the sampling is scheduled to occur between a start time and an end time.

10. The method according to claim 1, further comprising the step of repeating the method for subsequent sampling periods.

11. A system for monitoring a hardware component in a computing system, the system comprising:
    sampling means for sampling a utilization of the hardware component at a predefined sampling rate for a predefined sampling period;
    determination means for determining the proportion of the sampled values taken during the sampling period that fall within a predefined range of values; and
    storage means for storing a value representative of the proportion along with time information identifying the time of the sampling period.

12. The system according to claim 11, further comprising: defining means to allow any one of the sampling rate, the sampling period, or the range of values to be defined by a user.

13. The system according to claim 11, further comprising scheduling means to schedule the sampling to occur between a start time and an end time.

14. The system according to claim 11, further comprising deletion means for deleting the stored information after a predefined length of time has elapsed.

15. A computer program product, tangibly embodied in a computer-readable storage medium, for instructing a computing system to operate in accordance with a method, the method comprising the steps of:
    sampling a utilization of a hardware component at a predefined sampling rate for a predefined sampling period;
    determining the proportion of the sampled values taken during the sampling period that fall within a predefined range of values; and
    storing a value representative of the proportion along with time information identifying the time of the sampling period.

16. A computer-readable medium storing computer instructions according to a method, the method comprising the steps of:
    sampling a utilization of a hardware component at a predefined sampling rate for a predefined sampling period;
    determining the proportion of the sampled values taken during the sampling period that fall within a predefined range of values; and
    storing a value representative of the proportion along with time information identifying the time of the sampling period.

* * * * *